(12) United States Patent
Gillespie et al.

(10) Patent No.: US 7,331,550 B2
(45) Date of Patent: Feb. 19, 2008

(54) UNDERBODY MOUNTING SYSTEM

(75) Inventors: John Gillespie, Chicago, IL (US); Derrik Quang Lam, Cicero, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 142 days.

(21) Appl. No.: 10/785,516

(22) Filed: Feb. 24, 2004

(65) Prior Publication Data

US 2004/0164212 A1    Aug. 26, 2004

Related U.S. Application Data

(63) Continuation-in-part of application No. 10/283,790, filed on Oct. 30, 2002, now Pat. No. 6,915,995.

(51) Int. Cl.
*E04G 3/00* (2006.01)

(52) U.S. Cl. .............. 248/278.1; 248/295.11; 248/279.1; 248/920; 248/923

(58) Field of Classification Search ............ 248/278.1, 248/295.11, 279.1, 282.1, 283.1, 286.1, 920, 248/923, 922, 921, 284.1, 289.11, 291.1, 248/298.1, 919, 320, 324, 343, 344; 361/681–687, 361/725, 726, 727; 224/311, 315, 324; 296/37.7, 296/37.8

See application file for complete search history.

(56) References Cited

U.S. PATENT DOCUMENTS

| | | | | | |
|---|---|---|---|---|---|
| 5,037,267 | A | * | 8/1991 | Warner et al. | 414/744.6 |
| 5,566,915 | A | * | 10/1996 | Hansare | 248/188.8 |
| 5,799,917 | A | * | 9/1998 | Li | 248/284.1 |
| 6,095,468 | A | * | 8/2000 | Chirico et al. | 248/282.1 |
| 6,478,275 | B1 | * | 11/2002 | Huang | 248/284.1 |
| 7,063,296 | B2 | * | 6/2006 | Williams | 248/285.1 |
| 7,077,373 | B1 | * | 7/2006 | Hoebener et al. | 248/278.1 |
| 2005/0258321 | A1 | * | 11/2005 | Worrall et al. | 248/201 |

* cited by examiner

*Primary Examiner*—Kimberly Wood
(74) *Attorney, Agent, or Firm*—Foley & Lardner LLP

(57) ABSTRACT

A system for mounting a display device from the underside of a body having a planar surface, comprises a mounting bracket coupled to the planar surface of the underside of a body and a tilt block rotatably coupled to the mounting bracket. The tilt block is rotatable about an axis substantially perpendicular to the planar surface. A mounting arm is rotatably coupled the tilt block, and rotates about an axis substantially parallel to the planar surface. An adapter is movably and operatively connected to the mounting arm. The adapter is configured to accept a display device for mounting thereon.

11 Claims, 9 Drawing Sheets

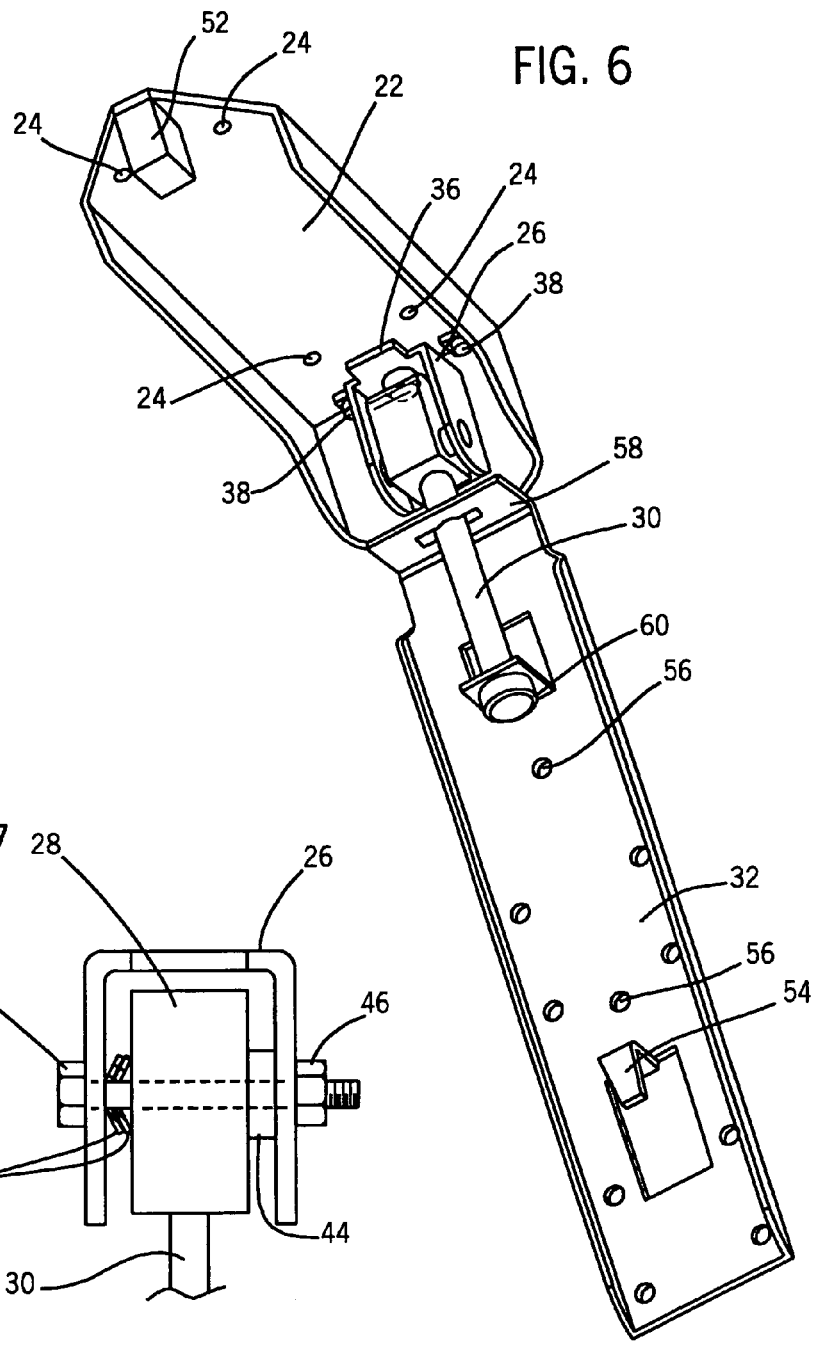

UNDERBODY MOUNTING SYSTEM

The present application is a continuation-in-part of U.S. patent application Ser. No. 10/283,790, filed Oct. 30, 2002 now U.S. Pat. No. 6,915,995 and incorporated herein by reference.

BACKGROUND OF THE INVENTION

The present invention is directed to a system for mounting a display unit to the underside of a body such as cabinets, shelves or similar structures.

SUMMARY OF THE INVENTION

Mounting systems for televisions monitors and liquid crystal display (LCD) units have been used for a number of years. Mounting systems are conventionally used to position a television or LCD display unit at a particular height and position that is desired by a particular user.

In recent years, both the size and the price of LCD units have decreased dramatically. This decrease in price has resulted in a surge in popularity and sales of LCD units. With this increase in popularity, however, there has also been an increase in the number of ways in which people would like to use LCD units. For example, it has become increasingly desirable to have an LCD unit mounted on the underside of a cabinet or shelf, as opposed to resting directly or indirectly upon a desktop or tabletop. This is primarily due to the fact that a person's counter and desk space can be quite limited, therefore necessitating placement of devices such as LCD units positioned above the desk. At the same time, however, there is also a need to have the ability to remove the LCD unit from view when not in use. For example, if an LCD unit is mounted on the underside of a shelf or cabinet but remains positioned such that it is viewable 24 hours a day, then the user loses a significant amount of space that could be used for other purposes when the user is not viewing the LCD unit.

A number of underbody mounting systems have been developed in recent years, but each have significant drawbacks. For example, some underbody mounting systems permit a user to locate the display device in one of only a limited number of positions. Other underbody mounting systems do not provide the user the ability to fully retract the display device when not in use, while other underbody mounting systems have a large amount of complexity in their design, increasing the component and product cost. Furthermore other mounting devices do not provide a mechanism for fixing the position of the display device in a single retracted position without the use of hand tools.

It would therefore be desirable to develop a simple device for mounting a display unit on the underside of a body such as a cabinet or shelf, while also providing the user with the ability to fully retract the display unit when not in use and also place the display unit in a number of different positions. It also would be desirable to develop a mounting system that allows the user to fix the position of the display device in a simple manner without the use of external tools.

SUMMARY OF THE INVENTION

A mounting system in accordance with the principles of the present invention provides a simple device for mounting a display unit on the underside of a body such as a cabinet or shelf, while also providing the user with the ability to fully retract the display unit when not in use and also place the display unit in a number of different positions. A mounting system in accordance with the principles of the present invention allows the user to fix the position of the display device in a simple manner without the use of external tools.

A mounting system in accordance with the principles of the present invention comprises a mounting bracket coupled to the underside of a body and a pivot bracket coupled to the mounting bracket. A pivot bracket is coupled to the mounting bracket at one end thereof. A tilt block is coupled to the pivot bracket and is rotatable about an axis substantially parallel to the body. A carriage bolt is coupled to the tilt block and is rotatable about an axis substantially perpendicular to the body. A display system bracket is operatively connected to the carriage bolt. The display system bracket is also connected to an interface bracket that specifically allows engagement to the display device. The mounting device is capable of tilting the display device up to about twenty degrees in the forward direction and ninety degrees to a fixed, closed position. The mounting device is also capable of rotating up to about ninety degrees to the left and right and also includes a passageway through which a power cord may be placed.

BRIEF DESCRIPTION OF THE DRAWINGS

The foregoing advantages and features of the invention will become apparent upon reference to the following detailed description and the accompanying drawings, of which:

FIG. 6 is a sectional perspective view of the mounting bracket, display system bracket, and the connecting components of the underbody mounting system of FIG. 1;

FIG. 7 is a rear view of the engagement between the pivot bracket and the tilt block of the underbody mounting system of FIG. 1;

DETAILED DESCRIPTION OF THE PREFERRED EMBODIMENTS

Figure 4:
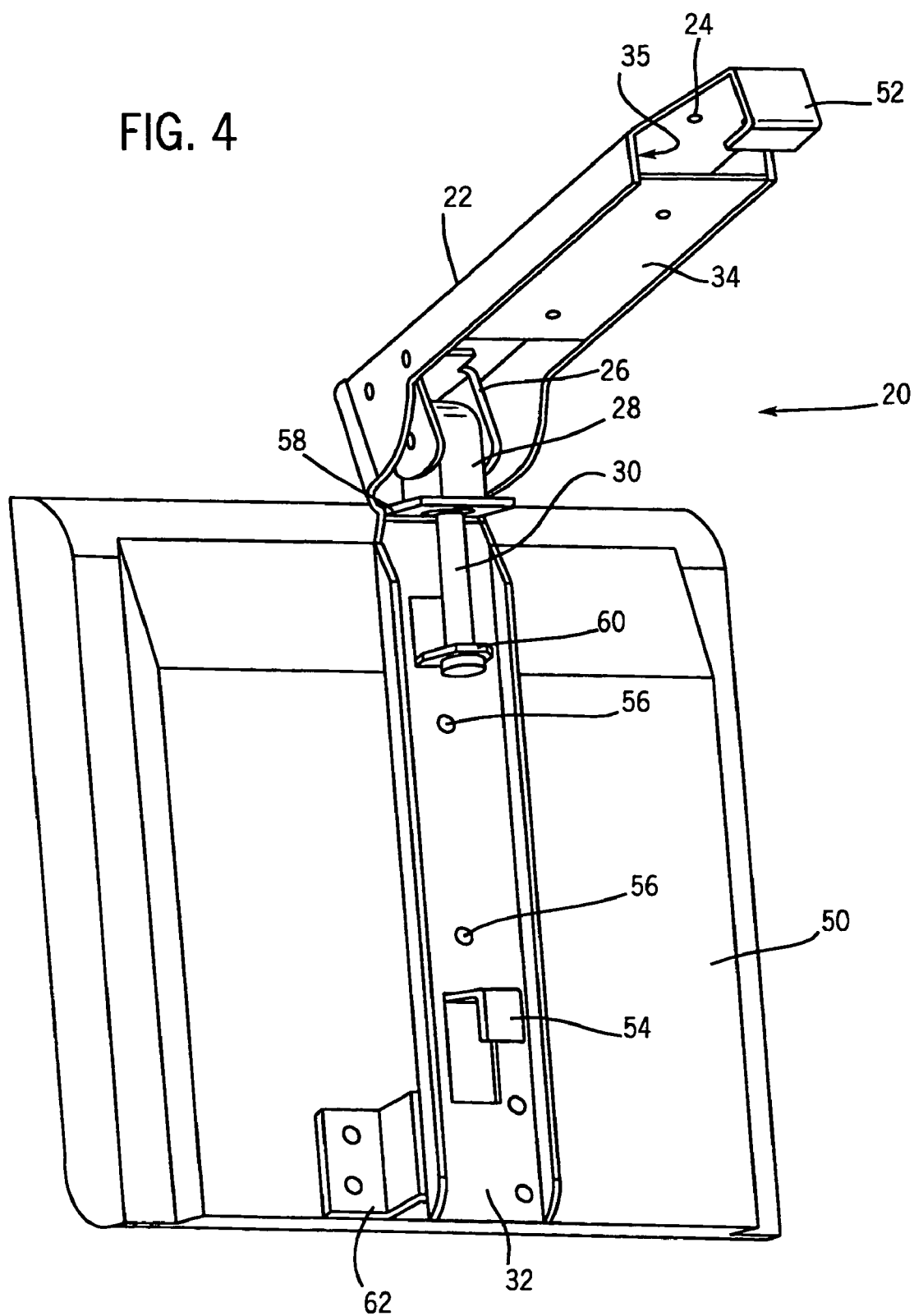
FIG. 4 is a reverse perspective view of the underbody mounting system of FIG. 2.

An underbody mounting system, according to one embodiment in accordance with the principles of the present invention, is shown generally at 20 in FIGS. 1-5. The underbody mounting system 20 comprises a mounting bracket 22 and a display system bracket 32. The mounting bracket 22 is coupled to a pivot bracket 26 which is operatively connected to a tilt block 28. The tilt block 28 is operatively connected to the display system bracket 32 by a carriage bolt 30. As shown in FIG. 4, the mounting bracket 22 includes a cover piece 34, which define a space 35 between the mounting bracket 22 and the cover piece 34. The space 35 may be used to route electrical cords, speaker cords, and/or other types of cords away from the display. This provides the user with the additional benefit of "hiding" the cords from view, providing a more efficient use of space and removing a potential obstruction or hazard from adjacent the display unit.

The mounting bracket 22 includes a plurality of mounting bracket holes 24 strategically located along the mounting bracket 22. The mounting bracket holes 24 are used to fixedly secure the mounting bracket 22 to the underside of a body such as a shelf or cabinet (not shown). A variety of types of screws or other fastening devices could be used to secure the mounting bracket 22 to the underside of the body. These devices are well known to those skilled in the art.

As shown in FIGS. 4 and 6, the mounting bracket 22 is coupled to a pivot bracket 26. Located on each side of the pivot bracket is a cover tab 38, the end of which can be seen in FIG. 5. The pivot bracket 26 includes a stop portion 36 at one end thereof. The pivot bracket 26 is rotatable relative to the mounting bracket 22. In one embodiment in accordance with the principles of the invention, the pivot bracket 26 is capable of rotating ninety degrees from center in both the clockwise and counterclockwise direction. When the mounting bracket 22 moves either about ninety degrees clockwise or about ninety degrees counterclockwise, the stop portion 36 comes into contact with one of the two cover tabs 38, preventing further movement of the mounting bracket 22. This allows the display device 50 to have a large degree of rotation, while also preventing the device cord (not shown) from becoming entangled or suffering an undue amount of stress.

As shown in FIGS. 4, 6 and 7, the pivot bracket 26 is rotatably coupled to a tilt block 28. In a preferred embodiment in accordance with the principles of the invention, the pivot bracket 26 is coupled to the tilt block 28, for example by a screw 40, which passes through both sides of the pivot bracket 26 and the tilt block 28. The pivot bracket 26 is coupled to the tilt block 28 such that the tilt block 28 is capable of rotating about an axis substantially perpendicular to the axis which the pivot bracket 26 rotates relative to the mounting bracket 22. In a preferred embodiment in accordance with the principles of the invention, a single nylon washer 44 is located on a screw 40 between one side of the pivot bracket 26 and the tilt block 28, and a pair of spring washers 42 are located on the other side of the tilt block 28 against the pivot bracket 26. A nut 46 is used to secure the screw 40 relative to the other components. The screw 40 is tightened against the nylon washer 44, the spring washers 42, the pivot bracket 26 and the tilt block 28 a sufficient amount such that the components in combination provide a built in tension for the tilt block 28 relative to the pivot bracket 26. This tension is set such that the position of the tilt block 28 will be fixed relative to the pivot bracket 26 in whatever position the display device 50 (and the tilt block 28) is placed. This results in a built-in positioning mechanism that does not require the use of external hand tools. The tension in the screw 40 is fixed and does not need to be adjusted by the user either to rotate or fix the position of the tilt block 28 relative to the pivot bracket 26.

The tilt block 28 is fixedly secured to a carriage bolt 30. The carriage bolt 30 passes through an upper portion 58 of the display system bracket 32 and couples to the display system bracket 32 at a bracket tab 60. The carriage bolt 30 is coupled to the tilt block 28 and the display system bracket 32 such that any rotation of one of the components results in a rotation of all three of the components. This permits the display system bracket 32 (along with the display device 50) to rotate at least about ninety degrees away from the mounting bracket 22.

In a preferred embodiment in accordance with the principles of the invention, the display system bracket 32 can rotate about one hundred ten degrees away from the mounting bracket 22, or about twenty degrees from an axis perpendicular to the underside of the body. The display system bracket 32 includes a plurality of display bracket holes 56 positioned in various locations thereon. A plurality of screws or other fastening devices (not shown) are capable of passing through the display bracket holes 56 to couple an interface bracket 62 to the display system bracket 32. The types and sizes of fastening devices that can be used are well known to those skilled in the art. A plurality of screws or other fastening devices (not shown) are capable of passing through the interface bracket 62 to couple the display device 50 to the display system bracket 32. In a preferred embodiment of the invention, different interface brackets 62 are used depending upon the type and model of the display device 50 that is to be used with the underbody mounting system 20 and is based upon the location of the individual holes that are formed in the back of the display device 50. The types and sizes of fastening devices that can be used are well known to those skilled in the art.

Figure 1:
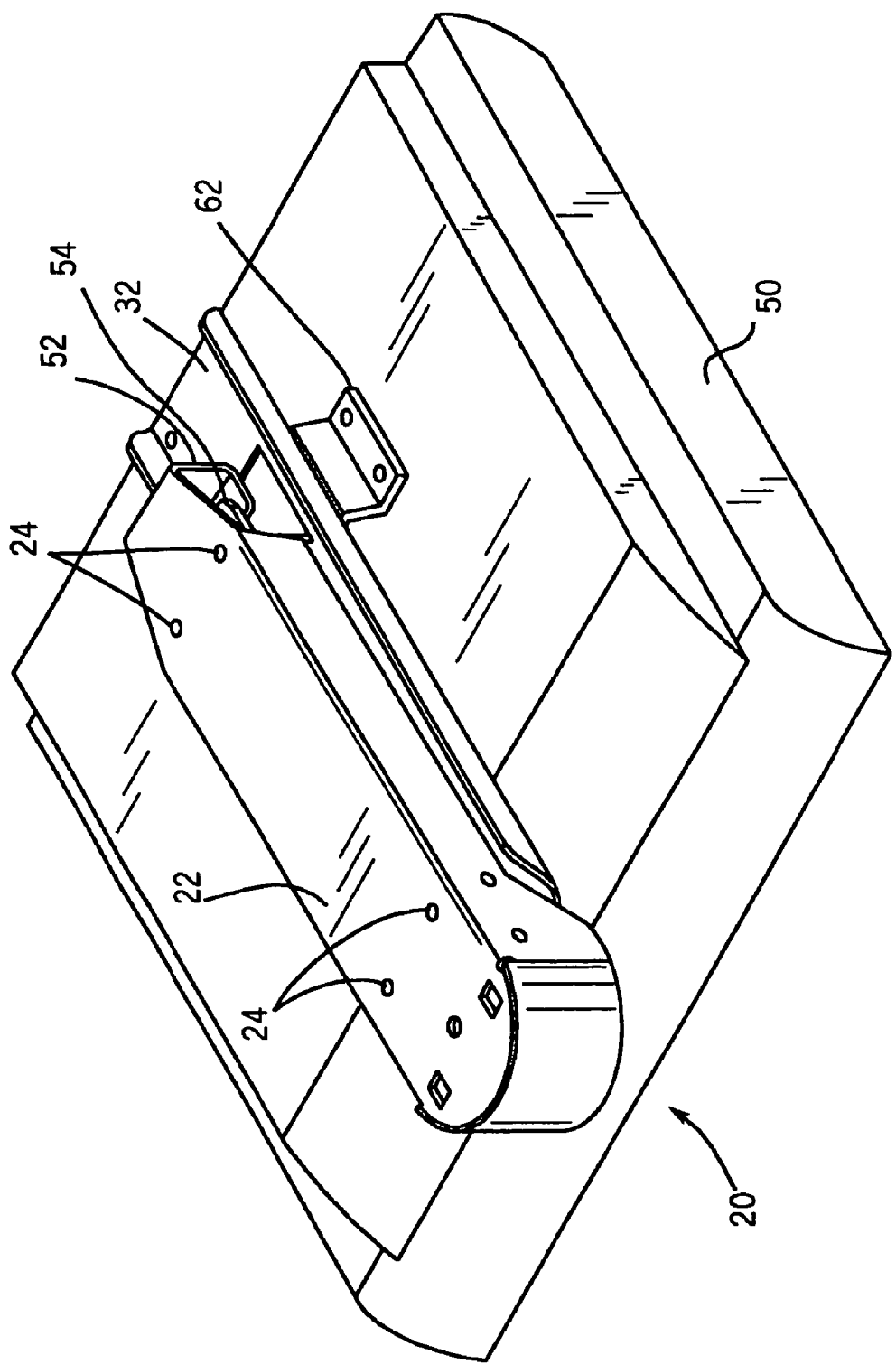
FIG. 1 is a perspective view of an underbody mounting system in an engaged position according to one embodiment in accordance with the principles of the present invention.
Figure 2:
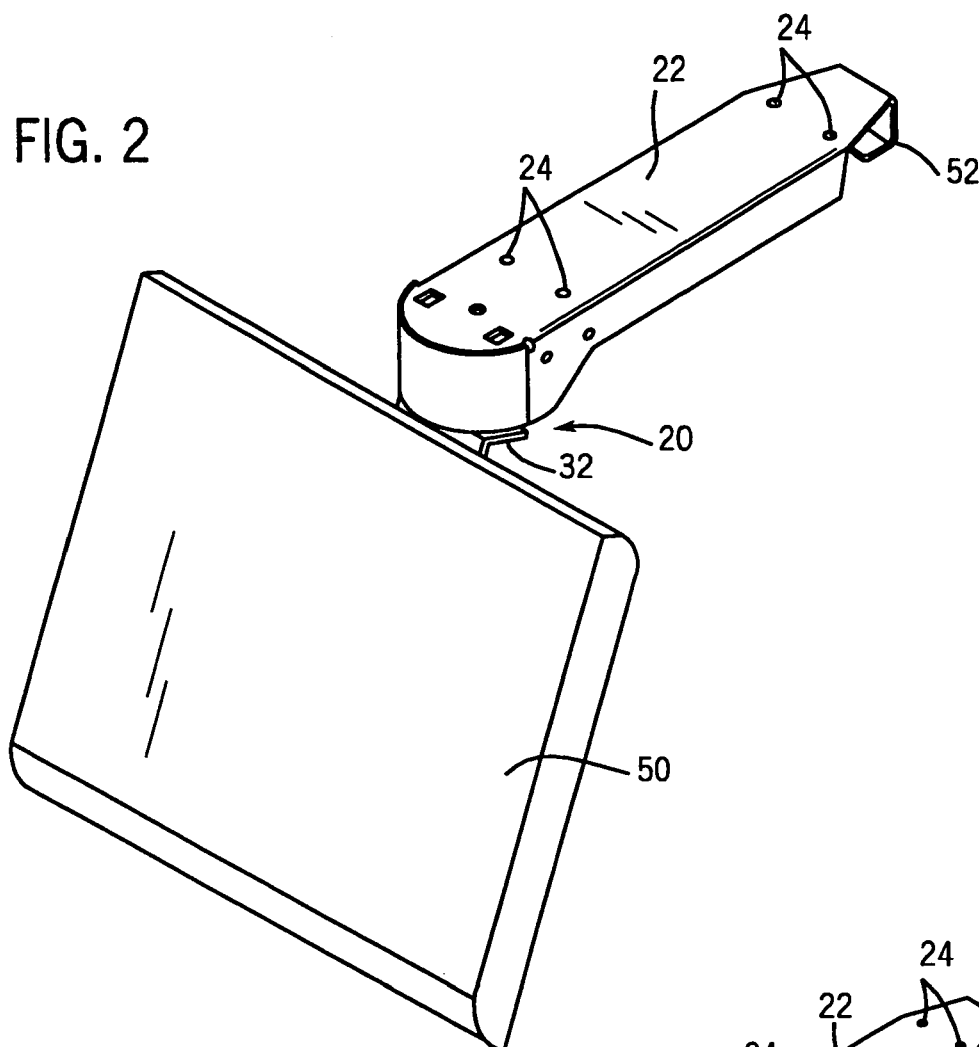
FIG. 2 is a perspective view of the underbody mounting system of FIG. 1 in a disengaged and retracted position.
Figure 3:
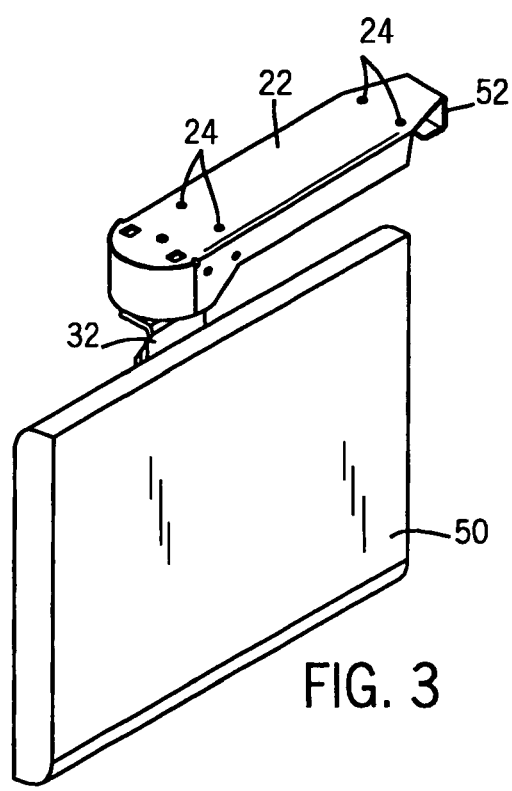
FIG. 3 is a perspective view of the underbody mounting system of FIG. 1 in a disengaged and unretracted position with the display unit rotated.
Figure 5:
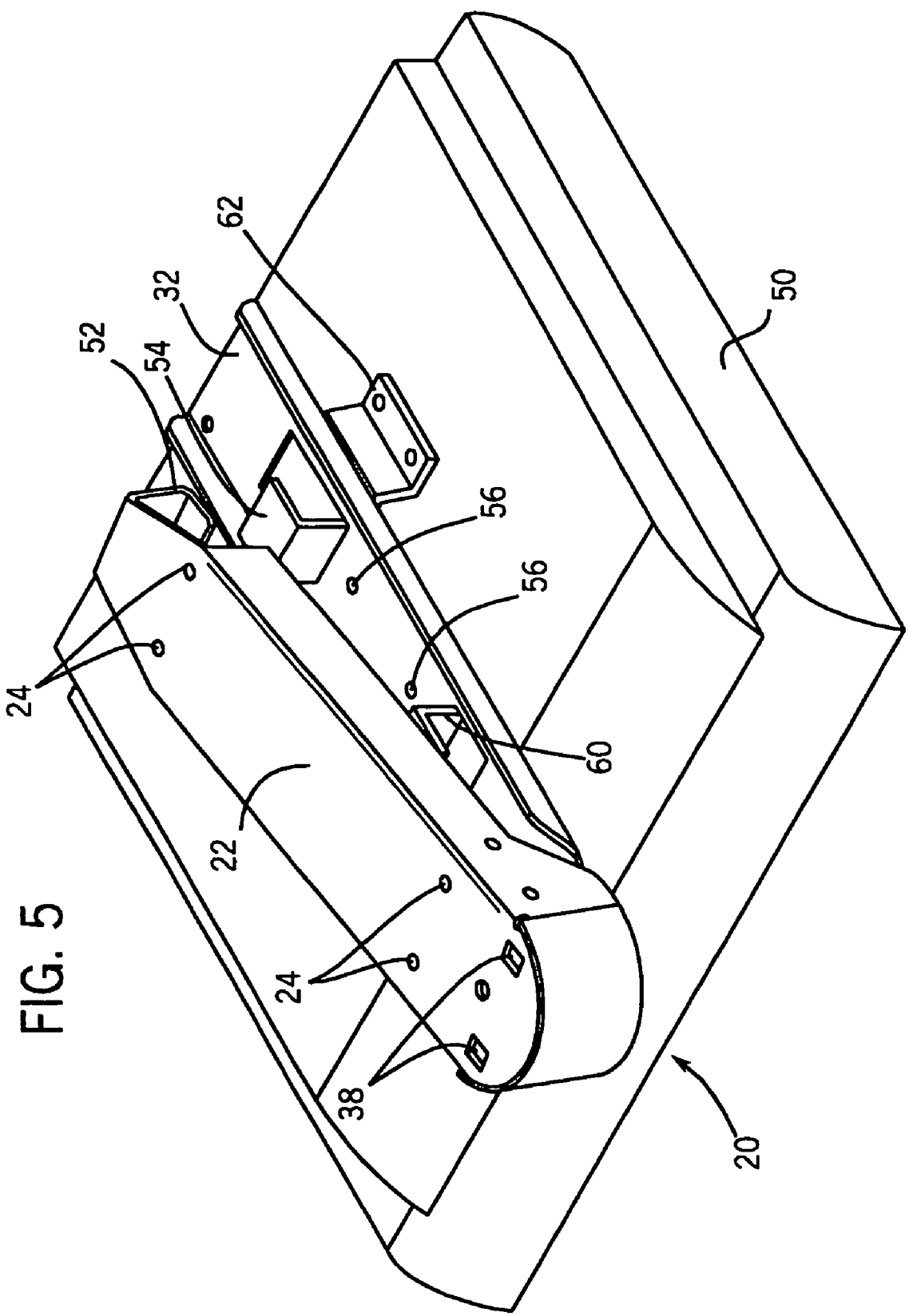
FIG. 5 is a perspective view of the underbody mounting system of FIG. 1 with the mounting bracket disengaged from the display system bracket but still in a retracted position.

In a preferred embodiment in accordance with the principles of the invention, the mounting bracket 22 includes a hook 52 and the display system bracket 32 includes a catch 54. The hook 52 and the catch 54 are positioned such that the hook 52 and the catch 54 are capable of mating with each other when the display device 50 is placed in a fully retracted and unrotated position, as shown in FIG. 1. As shown in FIG. 5, when a user desires to disengage the hook 52 from the catch 54, the display system bracket 32 is simply rotated a few degrees relative to the mounting bracket 22. Once the hook 52 and the catch 54 are disengaged from each other, the user is capable of "pulling" the display device 50 downward relative to the mounting bracket 22, placing the display device 50 in a desired position relative to the mounting bracket 22.

A design in accordance with the principles of the present invention allows the mounting bracket 22, the pivot bracket 26, the tilt block 28, the carriage bolt 30 and the display system bracket 32 all to be formed from a metallic material, such as anodized 6061 aluminum for the tilt block 28 and 1018 cold rolled steel for other components. The use of metal components reduces the wear of the assembly and helps to insure that the tilt of the display device 50 maintains its integrity after a number of cycles of use. The use of metal components also decreases the cost of manufacturing the underbody mounting system 20.

FIGS. 8-13 disclose a mounting system constructed in accordance with an alternate embodiment of the present invention. As shown in these figures, a mounting system 110 comprises a mounting bracket 120 operatively connected to a tilt block 122, which in turn is operatively connected to a mounting arm 124. The mounting arm 124 is operatively and slidably connected to an adapter 126, to which a display device (not shown), preferably in the form of an LCD screen, may be attached.

Figure 11:
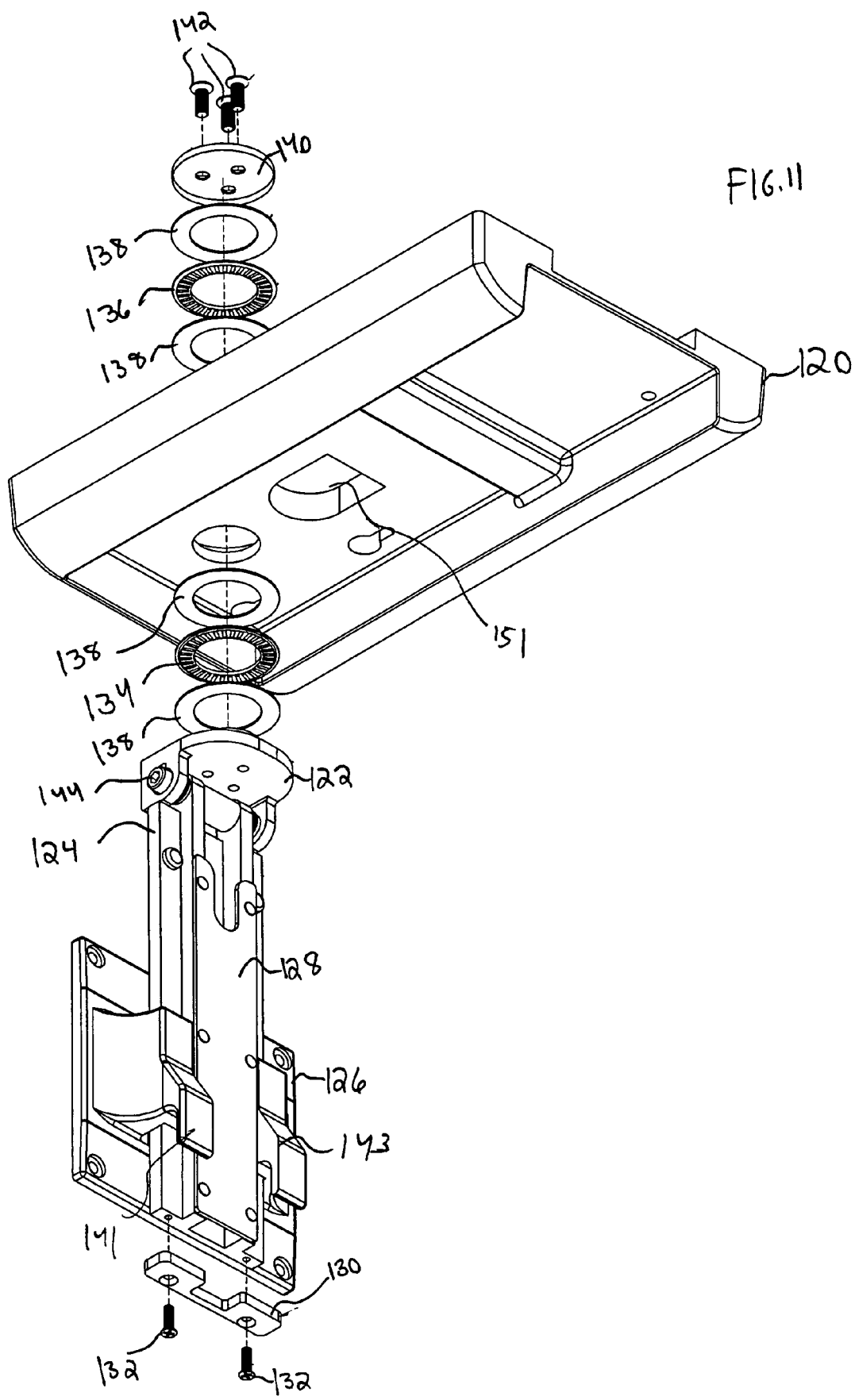
FIG. 11 is a reverse perspective, partially exploded view of the mounting system of FIG. 8.

As shown in FIG. 11, one embodiment of the invention includes a dual bearing system for enabling the tilt block 122 to rotate relative the mounting bracket 120 about an axis substantially perpendicular to the cabinet or other mounting surface. According to this particular embodiment, a first needle bearing 134 is positioned between the tilt block 122 and the mounting bracket 120. Needle bearing washers 138 are placed on either side of the first needle bearing 134. Similarly, a second needle bearing 136, surrounded by additional needle bearing washers 138, is positioned on the opposite side of the mounting bracket 120 between the mounting bracket 120 in the surface to which the mounting system 110 is attached. This dual bearing system permits the tilt block 122 to easily rotate about an axis substantially perpendicular to the surface to which the mounting system 110 is attached. A swivel plate 140 is fastened to the tilt block 122 via a plurality of fasteners 142. According to one embodiment of the invention, the plurality of fasteners 142 are in the form of 10-32×½" flathead phillips screws, although other types of fasteners may also be used.

Figure 12:
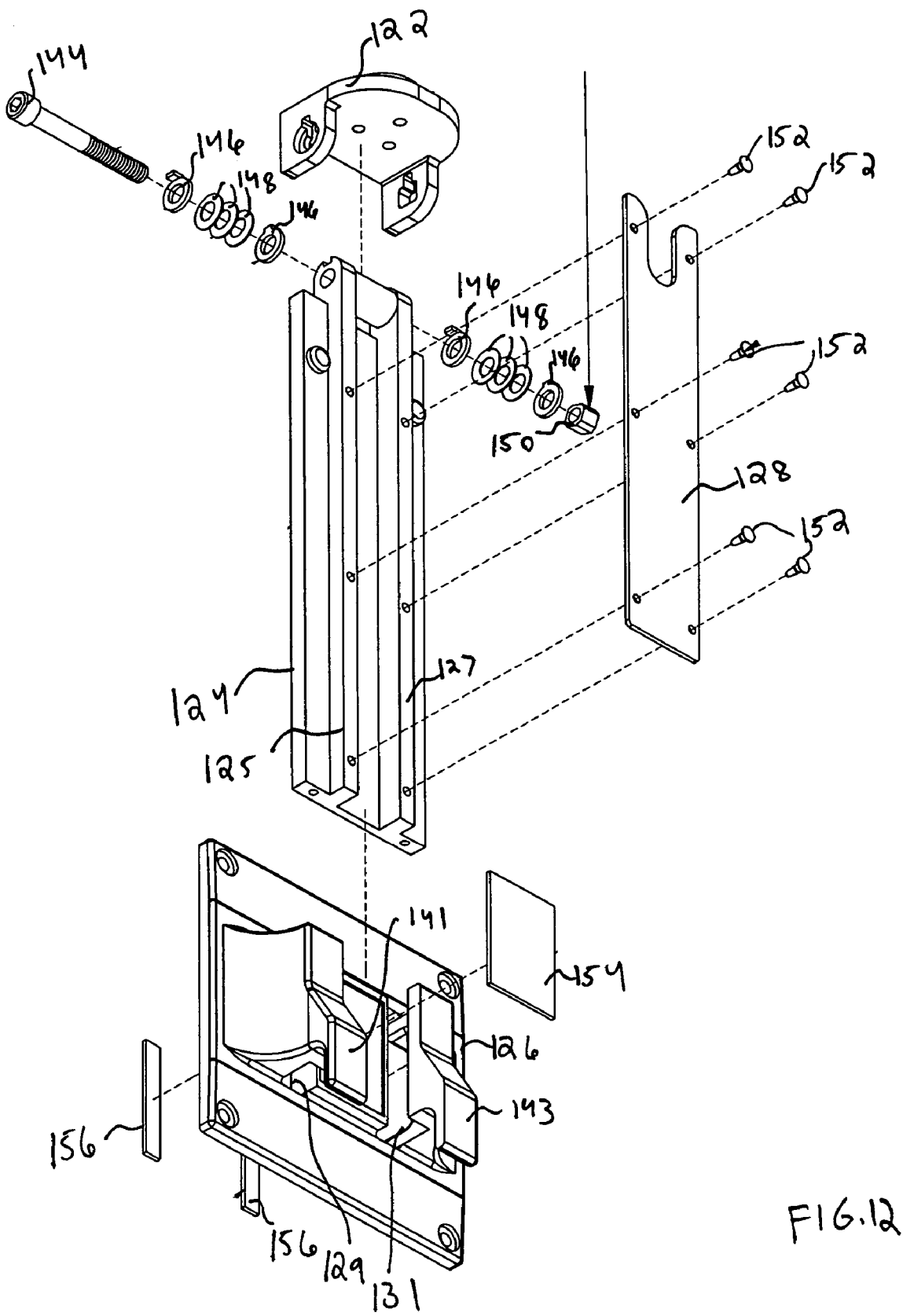
FIG. 12 is an exploded view of the lower portion of the mounting system of FIG. 8.
Figure 13:
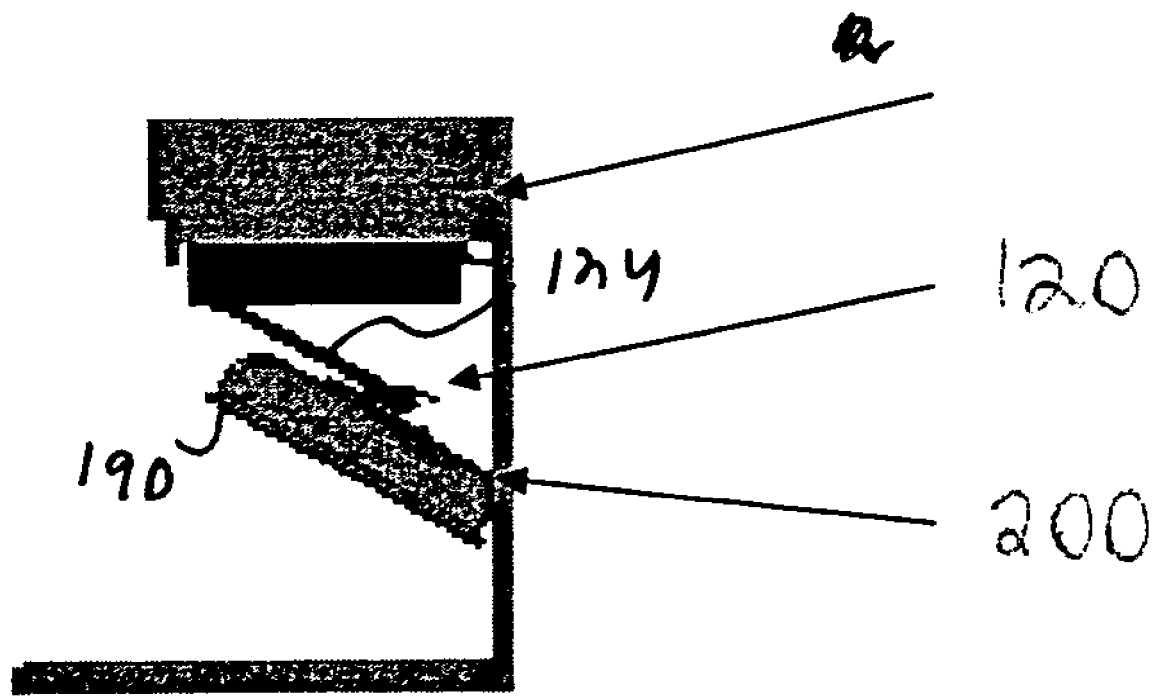
FIG. 13 is a side view of the mounting system of FIG. 8 when in an assembled position and mounted under a cabinet.

As shown in FIGS. 11 and 12, the mounting system 110 also includes a mechanism for permitting the adapter 126 to slide relative the mounting arm 124. The mounting arm 124 includes first and second track members 125 and 127 running substantially from one end of the mounting arm 124 to the opposite end. The adapter 126 includes first and second mating arms 141 and 143, with the first mating arm 141 engaging the first track member 125 and the second mating arm 143 engaging the second track member 127. The engagement of the first and second mating arms 141 and 143 with the first and second track members 125 and 127 permit the adapter 126 to slide along substantially the entire length of the mounting arm 124. Thus, this embodiment provides the added benefit of permitting the mounting system 110 to be used with a larger range of LCD screen sizes in areas that have limited mounting space. For example, in FIG. 13, when an LCD display 190 is positioned at the lower most point of the mounting arm 124, a portion of the LCD display 190 often can come into contact with a rear wall 200. This prevents the LCD display 190 from reaching a fully retracted position near the top of the cabinet or other surface. With this embodiment of the present invention, however, the LCD display 190 can slide along the mounting arm 124 such that it is able to clear the rear wall 200, allowing the entire LCD display 190 to become fully retracted.

As shown in FIG. 11, a mounting arm cap 130 may be fixedly secured to the lower end of the mounting arm 124 in order to prevent the adapter 126 from being removed from the mounting arm 124. According one embodiment of the invention, a pair of screws 132, in the form of 6-32×½" flathead phillips screws, are used to affix the arm cap 130 to the mounting arm 124, although other types of fasteners may also be used.

As shown in FIGS. 11 and 12, an arm cover plate 128 can be secured to the back side of the mounting arm 124, providing a region between the mounting arm 124 and the arm cover plate 128 through which a power cord for the LCD display 190 can be routed. This cord management feature effectively hides the cord from view, increasing the aesthetic appearance of the mounting system 110. The arm cover plate 128 also keeps the cord from being exposed to potential hazards. According to one embodiment of the invention, a plurality of plastic rivets 152 are used to secure the arm cover plate 128 to the mounting arm 124, although other fasteners may also be used.

Figure 10:
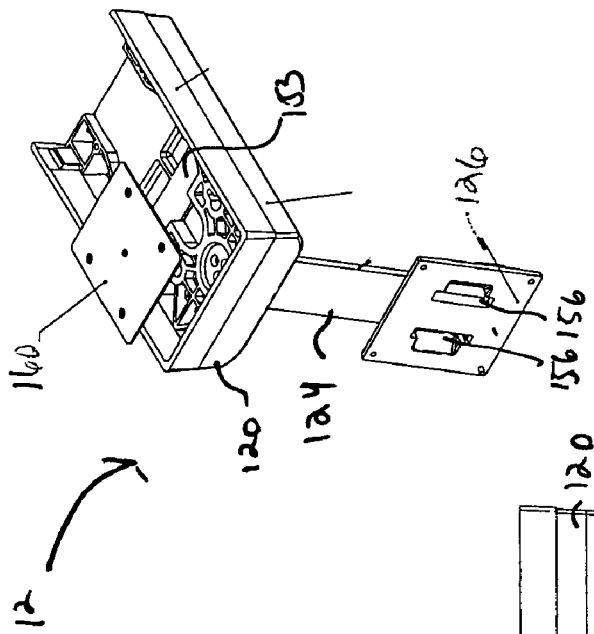
FIG. 10 is a perspective, partially exploded view of the mounting system of FIG. 8.
Figure 9:
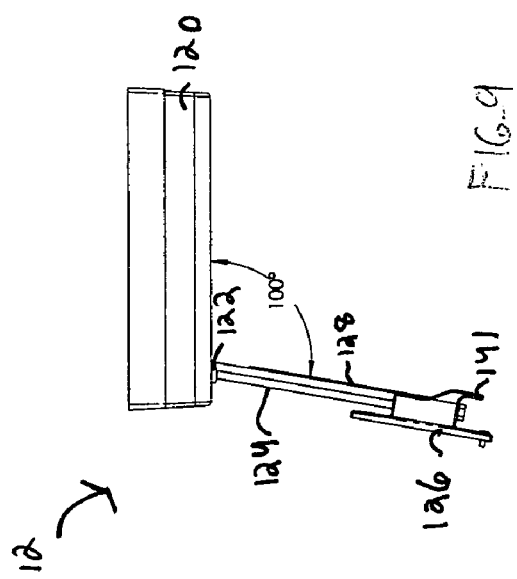
FIG. 9 is a side view of the mounting system of FIG. 8.
Figure 8:
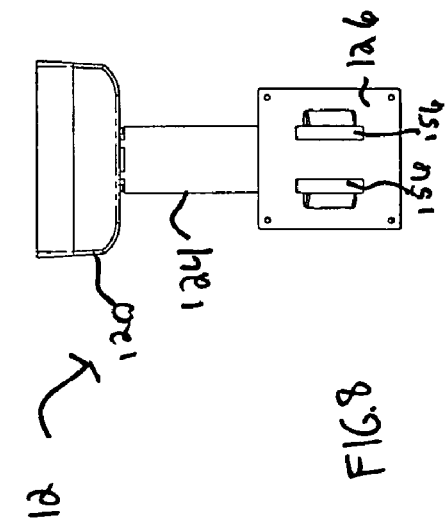
FIG. 8 is a front view of a mounting system constructed in accordance with another embodiment of the present invention.

The mounting bracket 120 also defines a hole 151 in the surface thereof through which the cord of the LCD display 190 may be routed. Additionally, and as shown in FIG. 10, the mounting bracket 120 includes a storage region 153 in order to store a "power brick" or AC adapter of the LCD display 190. The power brick rests in the region 153 underneath a mounting bracket cover plate 160. In addition to providing the aesthetic advantage of hiding the power brick from view, this feature protects the power brick from accidental interactions with the surrounding environment. The storage region 153 can be used for other functions as well. For example, the storage region 153 may be used as a spacer to allow for more clearance below a mounting surface, particularly in such in situations where there is a front trim piece that protrudes down from the mounting surface. In an alternate embodiment of the invention, the storage region 153 is not included at all, reducing the overall profile of the mount below the mounting surface.

FIG. 12 shows the mechanism by which the mounting arm 124 is rotatably coupled to the tilt block 122. This system, according to one embodiment of the invention, comprises a screw 144 or other adjusting mechanism that runs substantially through holes in both the tilt block 122 and the mounting arm 124. In a preferred embodiment of the invention, the screw 144 comprises a ¼-20×2" socket head cap screw. A plurality of tab washers 146 and spring washers 148 are also used in the connection system, and a nut 150 is used to secure the screw 144 in place. In one embodiment of the invention, the nut 150 comprises a ¼-20 square nut. This arrangement permits the mounting arm 124 to rotate about an axis substantially parallel to the mounting bracket 120, as well as the surface to which the mounting system 110 is attached.

What is claimed is:

1. A system for mounting a device from the underside of a body having a planar surface, comprising:
   a mounting bracket for attachment to an underside of a body having a planar surface;
   a tilt block rotatably coupled to the mounting bracket, the tilt block rotatable about a first axis substantially perpendicular to the mounting bracket;
   a mounting arm rotatably coupled the tilt block, the mounting arm rotatable about a second axis substantially parallel to the mounting bracket, the mounting arm having a single longitudinal axis;
   an adapter slidably, movably and operatively connected to the mounting arm, the adapter configured to accept a display device for mounting thereon; and
   a plurality of bearings for aiding the rotation of the tilt block relative the mounting bracket,
   wherein the adapter is configured to slide towards and away from the tilt block along the longitudinal axis of the mounting arm.

2. The system of claim 1, wherein the plurality of bearings comprise first and second needle bearings, the first and second needle bearings positioned on opposite sides of the mounting bracket.

3. A system for mounting a device from the underside of a body having a planar surface, comprising:
   a mounting bracket for attachment to an underside of a body having a planar surface;
   a tilt block rotatably coupled to the mounting bracket, the tilt block rotatable about a first axis substantially perpendicular to the mounting bracket;

a mounting arm having a single longitudinal axis and rotatably coupled with the tilt block, the mounting arm rotatable about a second axis substantially parallel to the mounting;

an adapter movably and operatively connected to the mounting arm, the adapter configured to accept a display device for mounting thereon; and means for sliding the adapter, connected to the mounting arm, along the longitudinal axis of the mounting arm, wherein the sliding means comprises:

at least one elongate track positioned on the mounting arm parallel with the single longitudinal axis; and at least one adapter arm positioned on the adapter for accepting the at least one elongate track, wherein the at least one adapter arm is slidable along the at least one elongate track;

wherein the at least one elongate track comprises two substantially parallel elongate tracks extending along substantially the entire length of the mounting arm, and wherein the at least one adapter arm comprises two substantially parallel adapter arms.

4. The system of claim 3, further comprising a cover piece coupled to the mounting arm, the cover piece and mounting bracket arranged to allow the passage of a cord therethrough.

5. A system for mounting a device from the underside of a body having a planar surface, comprising:

a mounting bracket for attachment to an underside of a body having a planar surface;

a tilt block rotatably coupled to the mounting bracket, the tilt block rotatable about a first axis substantially perpendicular to the mounting bracket;

a mounting arm having a single longitudinal axis and rotatably coupled with the tilt block, the mounting arm rotatable about a second axis substantially parallel to the mounting bracket;

an adapter movably and operatively connected to the mounting arm, the adapter configured to accept a display device for mounting thereon;

means for sliding the adapter, connected to the mounting arm, along the longitudinal axis of the mounting arm; and a plurality of bearings for aiding the rotation of the tilt block relative the mounting bracket.

6. The system of claim 5, wherein the plurality of bearings comprise first and second needle bearings, the first and second needle bearings positioned on opposite sides of the mounting bracket.

7. The system of claim 5, wherein the mounting bracket includes:

a lateral surface extending substantially parallel to the planar surface; and a region between the lateral surface and the planar surface for accepting a power source for the device.

8. A system for mounting a display device from the underside of a body having a planar surface, comprising:

a mounting bracket for attachment to an underside of a body having a planar surface and including a region therein;

a tilt block rotatably coupled to the mounting bracket, the tilt block rotatable about a first axis of rotation substantially perpendicular to the mounting bracket;

a mounting arm rotatably coupled the tilt block, the mounting arm having a single longitudinal axis and rotatable about a second axis of rotation substantially parallel to the mounting bracket;

a cover piece coupled to the mounting arm, the cover piece and mounting bracket arranged to allow the passage of a cord therethrough;

an adapter movably and operatively connected to the mounting arm, the adaptor slidable along the single longitudinal axis of the mounting arm and the adapter configured to accept the display device for mounting thereon;

a first bearing system positioned between the mounting bracket and the tilt block; and a second bearing system positioned between the mounting bracket and the planar surface, wherein the first bearing system and the second bearing system cooperate to permit the tilt block to rotate about the axis substantially perpendicular to the mounting bracket.

9. The system of claim 8, further comprising a mounting bracket plate removably connected to mounting bracket, the mounting bracket plate positioned between the planar surface and the region.

10. The system of claim 9, further comprising:

at least one elongate track positioned on the mounting arm; and at least one adapter arm positioned on the adapter for accepting the at least one elongate track, wherein the at least one adapter arm is slidable along the at least one elongate track.

11. The system of claim 8, wherein the at least one elongate track comprises two substantially parallel elongate tracks extending along substantially the entire length of the mounting arm, and wherein the at least one adapter arm comprises two substantially parallel adapter arms.

\* \* \* \* \*

UNITED STATES PATENT AND TRADEMARK OFFICE
CERTIFICATE OF CORRECTION

| | | |
|---|---|---|
| PATENT NO. | : 7,331,550 B2 | Page 1 of 1 |
| APPLICATION NO. | : 10/785516 | |
| DATED | : February 19, 2008 | |
| INVENTOR(S) | : John Gillespie and Derrik Quang Lam | |

It is certified that error appears in the above-identified patent and that said Letters Patent is hereby corrected as shown below:

IN THE SPECIFICATION

Column 5, line 53, "According one" should be --According to one--.

IN THE CLAIMS

Column 6, line 45, "coupled the" should be --coupled to the--.

Column 8, line 13, "coupled the" should be --coupled to the--.

Signed and Sealed this

Twelfth Day of August, 2008

JON W. DUDAS
*Director of the United States Patent and Trademark Office*